United States Patent
Masuch

(10) Patent No.: US 10,305,383 B2
(45) Date of Patent: May 28, 2019

(54) POWER CONVERTER

(71) Applicant: Dialog Semiconductor (UK) Limited, London (GB)

(72) Inventor: Jens Masuch, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/047,164

(22) Filed: Jul. 27, 2018

(65) Prior Publication Data

US 2019/0036453 A1    Jan. 31, 2019

(30) Foreign Application Priority Data

Jul. 28, 2017  (DE) .................. 10 2017 213 052

(51) Int. Cl.

| H02M 3/157 | (2006.01) |
|---|---|
| H02M 3/158 | (2006.01) |
| H02M 1/08 | (2006.01) |
| H02M 1/00 | (2006.01) |

(52) U.S. Cl.
CPC .............. *H02M 3/158* (2013.01); *H02M 1/08* (2013.01); *H02M 3/157* (2013.01); *H02M 2001/0009* (2013.01)

(58) Field of Classification Search
CPC ...... H02M 3/125; H02M 3/155; H02M 3/156; H02M 3/157; H02M 3/158; H02M 3/1582; H02M 1/08; H02M 2001/0009; G05F 1/56; G05F 3/10
See application file for complete search history.

(56) References Cited

U.S. PATENT DOCUMENTS

| 4,621,311 | A | 11/1986 | O'Brian | |
|---|---|---|---|---|
| 5,805,401 | A | 9/1998 | Schuellein et al. | |
| 9,806,617 | B1 * | 10/2017 | Ozawa | H02M 3/158 |
| 10,090,763 | B1 * | 10/2018 | Mercer | H02M 3/1582 |
| 10,122,260 | B2 * | 11/2018 | Weis | H02M 1/32 |
| 2008/0048631 | A1 * | 2/2008 | Kim | H02M 3/157 323/283 |
| 2009/0015227 | A1 * | 1/2009 | Wong | H02M 3/156 323/283 |

(Continued)

OTHER PUBLICATIONS

German Office Action, File No. 10 2017 213 052.0, Applicant: Dialog Semiconductor (UK) Limited, dated Jul. 9, 2018, 5 pages, and English language translation, 4 pages.

*Primary Examiner* — Adolf D Berhane
(74) *Attorney, Agent, or Firm* — Saile Ackerman LLC; Stephen B. Ackerman

(57) ABSTRACT

A power converter comprises an inductor coupled between a switching terminal and an output terminal of the power converter, a high side switching element coupled between an input terminal of the power converter and the switching terminal, a low side switching element coupled between the switching terminal and a reference terminal, and a feedback circuit comprising a continuous comparator unit configured to compare a ramp signal with an error signal using a first enable signal, a latched comparator unit configured to compare the ramp signal with the error signal using a second enable signal, wherein the error signal is based on a difference between a reference voltage and an output voltage at the output terminal of the power converter.

20 Claims, 8 Drawing Sheets

(56) References Cited

U.S. PATENT DOCUMENTS

| | | | | |
|---|---|---|---|---|
| 2009/0278521 A1* | 11/2009 | Omi | ............ | H02M 1/36 |
| | | | | 323/288 |
| 2011/0018516 A1* | 1/2011 | Notman | ............ | H02M 3/1588 |
| | | | | 323/284 |
| 2011/0241642 A1* | 10/2011 | Xi | ............ | H02M 3/1588 |
| | | | | 323/285 |
| 2012/0049829 A1* | 3/2012 | Murakami | ............ | H02M 1/32 |
| | | | | 323/288 |
| 2014/0268909 A1* | 9/2014 | Digiacomo | ............ | H02M 3/33553 |
| | | | | 363/21.04 |

* cited by examiner

POWER CONVERTER

TECHNICAL FIELD

The present document relates to power converters. In particular, the present document relates to synchronous current control buck converters.

BACKGROUND

A buck converter is a DC-to-DC power converter, which belongs to the class of Switched-Mode Power Supplies (SMPS). It is widely used throughout the industry to convert a higher input voltage into a lower output voltage. It is well-known in the art that this behavior may be achieved by alternatingly connecting an inductor according to a variable duty cycle (a) to the input terminal of the power converter using a high side switching element or (b) to ground using a low side switching element. In case the output voltage drops too fast below a pre-determined reference voltage, the power converter will attempt to maximize its duty cycle. This may happen during a load transient or when drawing too much current from the output of the power converter. In an synchronous valley mode current control architecture, for example, the maximum duty cycle may be limited by the minimum on-time of the low side switching element. This minimum on-time of the low side switching element severely depends on the delay of the continuous comparator used to compare an error voltage (indicating a difference between the actual output voltage and the reference voltage) and a ramp voltage.

Moreover, the maximum duty cycle of the power converter also sets the maximum speed at which the inductor current may be increased. It eventually also limits the maximum current that can be drawn from the output of the power converter if resistive losses are taken into account.

A similar limitation exists for the synchronous peak mode current control architecture. In this case, the minimum on-time of the high side switching element limits the minimum duty cycle of the power converter, and thereby limits the power converter's capability to decrease the inductor current, and eventually also to sink current at the output of the power converter.

To cope with these problems, the comparator delay has to be minimized. However, reducing the delay of a continuous comparator usually requires more bias current, and hence decreases the power efficiency of the converter. Therefore, delay minimization is only possible up to a certain extent. Another solution in conventional converters is to skip clock edges and thereby reduce the frequency of the output stage. This causes a higher current ripple, and also makes the frequency dependent on load conditions, which may not be desired in some applications.

SUMMARY

The present document addresses the above-mentioned technical problems. In particular, the present document addresses the technical problem of increasing the maximum duty cycle or decreasing the minimum duty cycle of a current controlled buck converter without changing its frequency. To be even more specific, it is an objective of the present document to reduce the minimum on-times of the high side switching element or the low side switching element of a current controlled buck converter.

According to an aspect, a power converter comprises an inductor coupled between a switching terminal and an output terminal of the power converter, a high side switching element coupled between an input terminal of the power converter and the switching terminal, a low side switching element coupled between the switching terminal and a reference terminal, and a feedback circuit comprising a latched comparator unit configured to compare a ramp signal with an error signal, where the error signal is based on a difference between a reference voltage and an output voltage at the output terminal of the power converter.

The latched comparator unit may be configured to generate a binary output signal indicating which of the two input signals (i.e. the ramp signal or the error signal) has a larger signal value at a certain, well-defined sampling moment. For example, the sampling moment may be indicated by the rising edge or the falling edge of a first enable signal which is supplied to the latched comparator unit, where the first enable signal is different from the ramp signal and the error signal. At this sampling moment, the instantaneous signal values of the ramp signal and the error signal may be sampled and compared by the latched comparator unit. The latched comparator unit may be configured to compare the ramp signal and the error signal at a moment in time indicated by the first enable signal. Due to its strong positive feedback, the latched comparator unit is much faster than a continuous comparator, and the binary output signal is provided at the output of the latched comparator unit with a relatively short delay after the sampling moment. Moreover, the usage of a latched comparator unit provides the advantage that, once the decision process is finished, the current flow through the latched comparator unit automatically stops, and the static power consumption of the latched comparator unit is minimized.

The term latched comparator unit is used to describe a comparator, also known as a dynamic or clocked comparator that is different from a continuous comparator. A continuous comparator, in contrast, continuously compares its two input signals and its binary output signal automatically changes from low to high or from high to low whenever the magnitude ratio of the input signals changes accordingly. However, after such a change of the magnitude ratio, the delay with which the binary output signal is provided at the output of the continuous comparator is substantially larger than the delay that would be achieved by a latched comparator unit, which is enabled (by a respective enable signal) at the moment when the change of the magnitude ratio happens.

Both the high side switching element and the low side switching element may be implemented with any suitable device, such as, for example, a Metal-Oxide-Semiconductor Field Effect Transistor (MOSFET), an Insulated-Gate Bipolar Transistor (IGBT), a MOS-gated thyristor, or other suitable power device. Each switching element has a gate to which a respective driving voltage or control signal may be applied, to turn the switching element on or off. On the one hand, if the high side switching element is turned on, an electrically conducting path is formed between the input terminal and the inductor via the switching terminal. If the high side switching element is turned off, the switching terminal is isolated from the input terminal of the power converter. If the low side switching element is turned on, an electrically conducting path is formed between the reference terminal and the inductor via the switching terminal. If the low side switching element is turned off, the switching terminal is isolated from the reference terminal.

The reference terminal may be ground. In general, however, the term reference terminal is meant in its broadest possible sense and is not limited to a ground terminal with a direct physical connection to earth. Rather, the term reference terminal may refer to any reference point to which and from which electrical currents may flow or from which voltages may be measured.

As indicated in the forgoing description, the power converter may be configured to generate, based on the comparison of the ramp signal and the error signal, a binary output signal, and the power converter may be configured to control the switching of the low side switching element or the high side switching element based on the binary output signal. The power converter may be a switched mode power converter that is current controlled. To be more specific, the power converter may be a synchronous buck converter with current mode control. For instance, in case of a synchronous valley mode current control buck converter, the low side switching element may be turned off in accordance with the binary output signal generated by the latched comparator unit. Alternatively, in case of a synchronous peak mode current control buck converter, the high side switching element may be turned off in accordance with the binary output signal generated by the latched comparator unit.

In general, the ramp signal may be generated by a ramp signal generator, which is not necessarily part of the claimed power converter. The ramp signal generator may periodically output a ramp voltage that repeatedly rises in accordance with a positive ramp slope until a given upper ramp voltage level is reached, and subsequently falls in accordance with a negative ramp slope until a given lower ramp voltage level is reached. Any of the positive ramp slope, the negative ramp slope, the upper ramp voltage level, and the lower ramp voltage level may be variable.

More specifically, the ramp signal may be generated by adding or subtracting a current sense signal of a current through the low side or high side switching element to an artificial ramp signal. For this purpose, the power converter may comprise a current measurement circuit configured to determine an inductor current through the inductor or a switch current through the low side switching element, where the ramp signal is based on the determined inductor current or the switch current through the low side switching element, respectively.

In addition to the latched comparator unit, the feedback circuit may comprise a continuous comparator unit configured to continuously compare the ramp signal and the error signal, and the power converter may be configured to control the switching of the low side switching element or the high side switching element based on both a binary output signal generated by the continuous comparator unit and a binary output signal generated by the latched comparator unit. As for the latched comparator unit, the binary output signal generated by the continuous comparator unit indicates which of the two input signals (i.e. the ramp signal or the error signal) has a larger signal value. This time, however, the comparison is not only performed at a certain instance of time, but rather continuously during a time period during which the continuous comparator unit is enabled to perform the comparison of its input signals. This time period may be defined and indicated by a second enable signal, which is received by the continuous comparator unit. Whenever the ramp signal crosses the error signal, the binary output signal of the continuous comparator unit changes its value with some time delay. As previously discussed, this time delay may be substantially larger than the time delay that would be introduced by a latched comparator unit in the same situation, i.e. when the latched comparator unit is enabled shortly after the ramp signal has crossed the error signal.

The power converter may further comprise an OR gate configured to determine a combined binary output signal based on the binary output signal generated by the continuous comparator unit and the binary output signal generated by the latched comparator unit. The power converter may then be configured to control the switching of the low side switching element or the high side switching element based on the combined binary output signal. Thus, it becomes possible to benefit both from the quick response time of the latched comparator unit and from the continuous surveillance of the input signals by the continuous comparator unit. Assume, for example, that there is a time interval during which the continuous comparator unit is enabled to monitor the input signals and to detect the time instance when the ramp signal crosses the error signal. If now the signal value of the error signal is already smaller than the signal value of the ramp signal at the beginning of the time interval, and the latched comparator unit is enabled at or shortly after the beginning of the time interval, the latched comparator unit will immediately fire after a very short delay. The latched comparator unit will fire before the continuous comparator unit and, in the described scenario, the delay for detecting a crossing of the input signals may be substantially reduced.

In valley mode control, for example, the power converter may be configured to turn on the low side switching element with the rising edge of a common clock signal. Subsequently, the power converter may be configured to turn off the low side switching element or the high side switching element when the combined binary output signal changes its signal value. Hence, the combined usage of a latched comparator unit which is arranged in parallel to a continuous comparator unit and the computation of a logic disjunction of both comparator outputs with the help of the OR gate allows for a reduction of the minimum on-time of the low side switching element. This in turn leads to an increased maximum duty cycle of the synchronous valley mode buck converter. With a higher duty cycle the buck converter can deliver more current at a given output voltage and is also able to increase the output current faster. This improves the load step behavior without changing the frequency. In peak mode control, the described usage of a latched comparator unit enables a reduced on-time of the high side switching element and, as a consequence, a decreased minimum duty cycle of the power converter. With a smaller minimum duty cycle the buck converter can sink more current and can also reduce the output current faster, which improves the load release performance.

The continuous comparator unit may be configured to continuously compare the ramp signal and the error signal during a time interval, and the latched comparator unit may be configured to compare the ramp signal and the error signal at an instance of time at the beginning of the time interval. In this way, a quick evaluation of both input signals becomes possible at the beginning of the time interval and the power converter may potentially benefit from the advantages of a latched-type comparator. If a quick evaluation is not possible, a subsequent crossing of the ramp signal and the error signal may be detected by the continuous comparator unit. For instance, the instance of time may be indicated by a first enable signal, the time interval may be indicated by a second enable signal and the second enable signal may be an inverted version of the first enable signal. In other words, the first enable signal may be reused to enable and disable both comparator units, thus simplifying the design of the feedback circuit.

The term synchronous buck converter refers to scenarios in which the switching of the switching elements may depend at least to some extent on a common clock signal. For example, in a valley mode current control buck converter, the low side switching element may be turned on in response to a rising edge (or falling edge) of the common clock signal. Similarly, in a peak mode current control buck converter, the high side switching element may be turned on in response to a rising edge (or falling edge) of the common clock signal.

According to another aspect, a method for controlling the high side switching element and the low side switching element of a power converter is described, where the power converter comprises an inductor coupled between a switching terminal and an output terminal of the power converter, where the high side switching element is coupled between an input terminal of the power converter and the switching terminal, and where the low side switching element is coupled between the switching terminal and a reference terminal. The method comprises providing a latched comparator unit in a feedback circuit of the power converter. The latched comparator unit compares a ramp signal with an error signal, where the error signal is based on a difference between a reference voltage and an output voltage at the output terminal of the power converter.

Specifically, the latched comparator unit may not compare the latter signals (i.e. the ramp signal and the error signal) continuously like a continuous comparator, but may only perform the comparison at a well-defined moment in time, which is indicted by a first enable signal. At this indicated moment, the instantaneous signal values of the ramp signal and the error signal are sampled and compared by the latched comparator unit. The latched comparator unit may generate a binary output signal based on the comparison of the ramp signal and the error signal and control the switching of the low side switching element or the high side switching element based on the binary output signal.

Additionally, a continuous comparator unit may be provided in the feedback circuit of the power converter. The continuous comparator unit may continuously compare the ramp signal with the error signal during a time interval indicated by a second enable signal, and the power converter may control the switching of the low side switching element or the high side switching element based on both a binary output signal generated by the continuous comparator unit and a binary output signal generated by the latched comparator unit. For this purpose, an OR gate may be provided in the feedback circuit of the power converter. In this case, the method comprises a step of determining, by the OR gate, a combined binary output signal based on the binary output signal generated by the continuous comparator unit and the binary output signal generated by the latched comparator unit, and a step of controlling the switching of the low side switching element or the high side switching element based on the combined binary output signal.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term couple, connect, coupled or connected refers to elements being in electrical communication with each other, whether directly connected via wires, or in some other manner.

BRIEF DESCRIPTION OF THE DRAWINGS

The invention is explained below in an exemplary manner with reference to the accompanying drawings.

DETAILED DESCRIPTION

Figure 1:
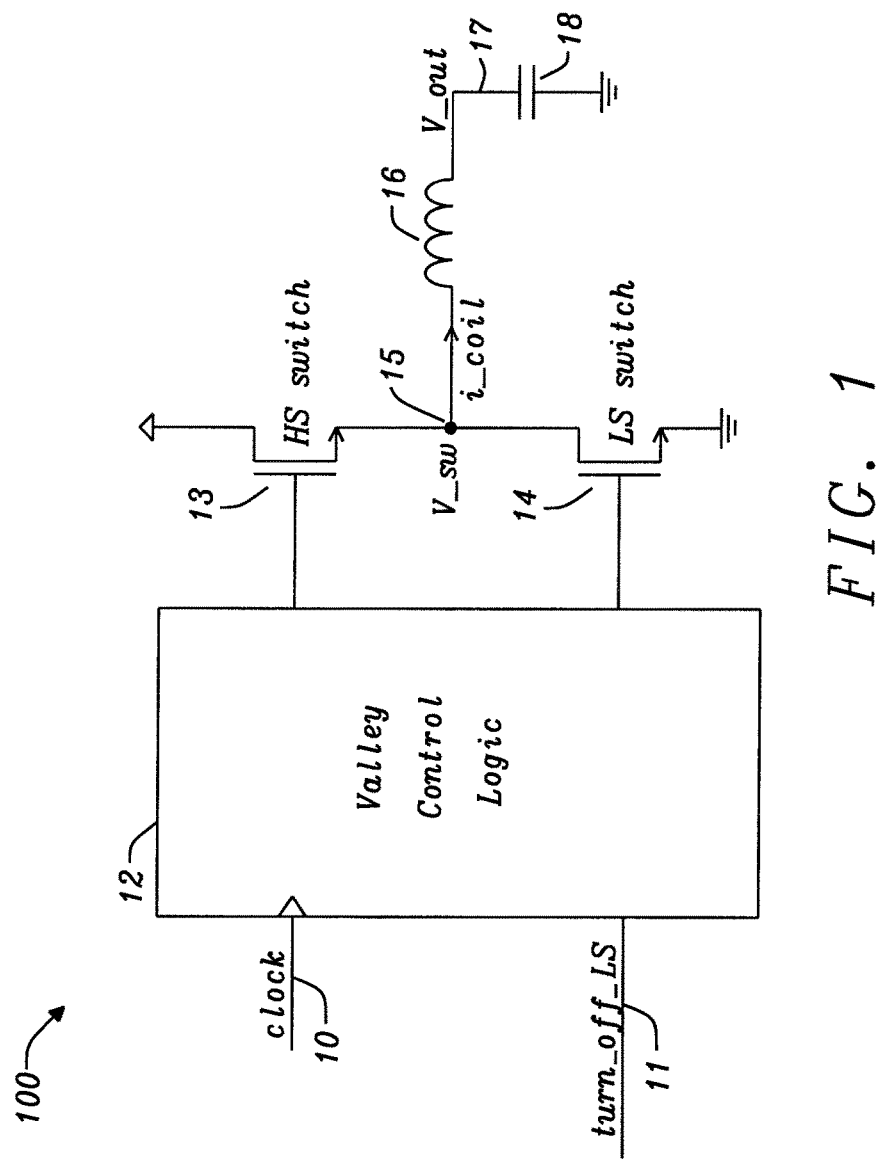
FIG. 1 shows components of a switched mode power converter, illustrating valley control logic, and high-side and low-side switches, of the prior art.

FIG. 1 shows 100, components of a switched mode power converter, illustrating valley control logic, and high side and low side switches, which are known from the prior art. The power stage of the power converter comprises an inductor 16 coupled between a switching terminal 15 and an output terminal 17 of the power converter, a high side switching element 13 coupled between an input terminal of the power converter and the switching terminal 15, and a low side switching element 14 coupled between the switching terminal 15 and ground. At the output of the power converter, an output capacitor 18 connects the output terminal 17 with ground. The switching behavior of the high side switching element 13 and the low side switching element 14 is controlled by the valley control logic module 12, which receives a clock signal 10 and signal 11 (turn_off_LS) for turning off the low side switching element 14. In FIG. 1, the voltage at the switching terminal 15 is denoted as V_sw.

Figure 2:
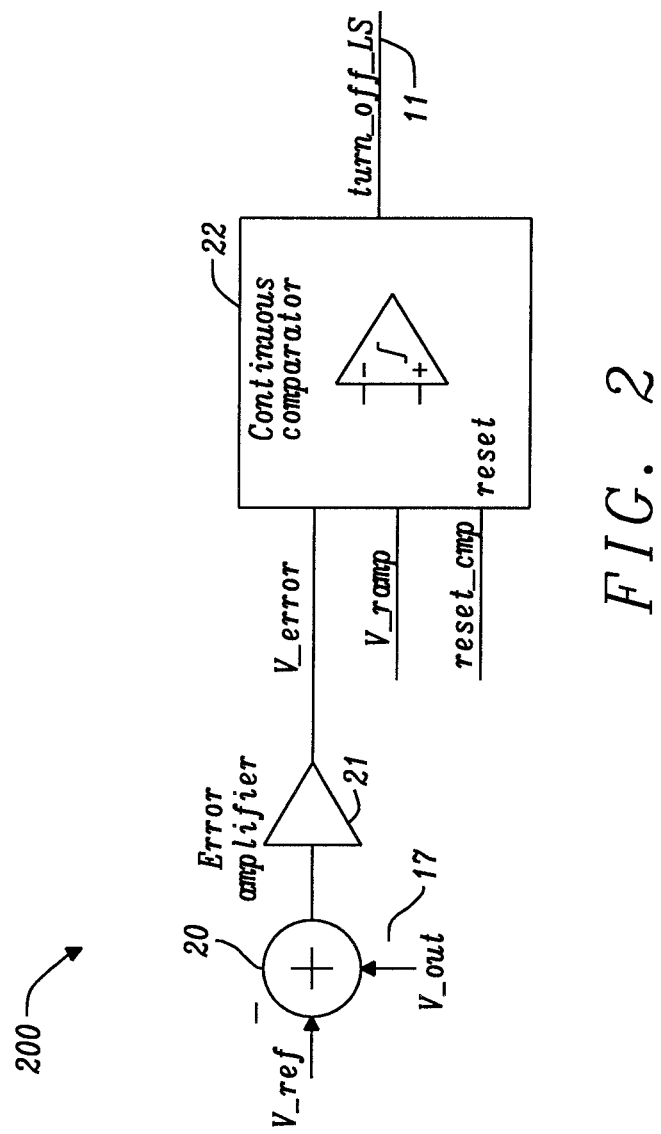
FIG. 2 shows components of a switched mode power converter, including a feedback circuit, which may be used for controlling the switching behavior of the power stage of FIG. 1.

FIG. 2 illustrates 200, components of a switched mode power converter, including a feedback circuit, which may be used for controlling the switching behavior of the power stage of FIG. 1. The exemplary feedback circuit is known from the prior art and comprises a difference determination unit 20 which is configured to determine a difference between a reference voltage V_ref and the output voltage V_out, where the output voltage V_out is fed back from the output terminal 17 of the power converter to the input of the difference determination unit 20. Further, the feedback circuit may comprise an optional error amplifier 21 for amplifying the error voltage (error signal) V_error determined by the difference determination unit 20. A continuous comparator 22 may be enabled with the help of a first enable signal denoted as reset_cmp to compare the ramp voltage (ramp signal) V_ramp and the error voltage V_error at its inputs. Depending on the signal values of ramp signal V_ramp and the error voltage V_error, the continuous comparator 22 generates signal 11 for turning off the low side switching element 14, where signal 11 is subsequently supplied to the valley control logic module 12 (see FIG. 1).

The present document relates to power converters such as the synchronous current control buck converter illustrated in FIGS. 1 and 2. In a synchronous current control buck converter, the minimum on-time of switching element 13 or 14 is limited by the speed of the continuous comparator 22 that compares the ramp voltage to the error voltage. For example, in the valley mode current control buck depicted in FIGS. 1 and 2, the low side switching element 14 is turned on every clock edge of the clock signal 10 and it is turned off again when the ramp voltage crosses the error voltage. In this exemplary feedback circuit, the ramp voltage is generated by adding an inverted current sense signal of the current through the low side switching element plus an artificial ramp signal. To ensure that the continuous comparator 22 only observes and compares the error voltage and the ramp voltage while the latter are valid, the timing of the first enable signal reset_cmp is adjusted accordingly.

Figure 3:
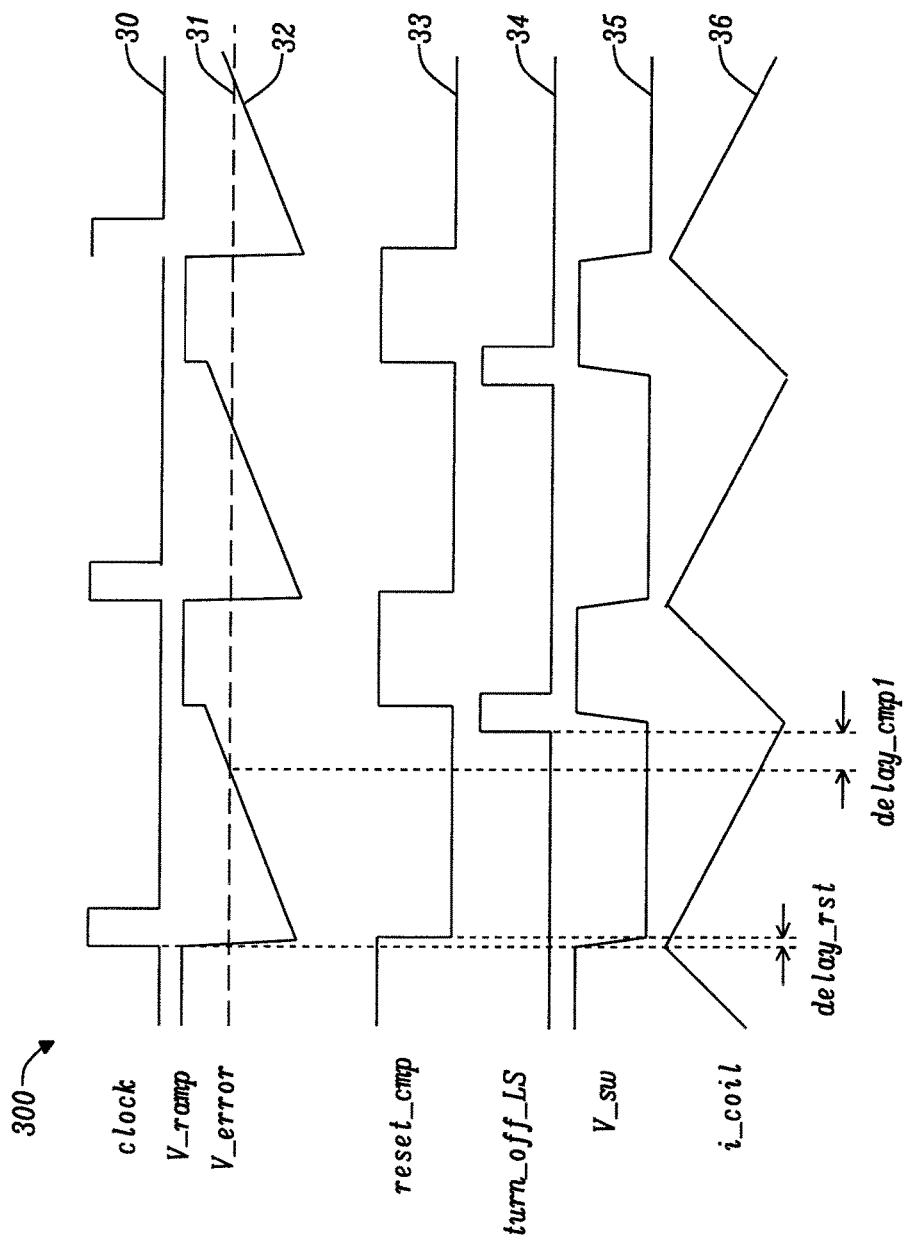
FIG. 3 shows a sequence of signals in a synchronous valley mode current control buck converter in a closed loop operation.

FIG. 3 shows 300, a sequence of signals for the synchronous valley mode current control buck converter of FIGS. 1 and 2, in a closed loop operation. FIG. 3 illustrates the clock signal 30, the error voltage 31, the ramp voltage 32, the first enable signal 33, signal 34 for turning off the low side switching element 14, the voltage V_sw 35 at the switching terminal 15 and the inductor current i_coil 36. In FIG. 3, the delay of the continuous comparator 22 is highlighted and denoted as delay_cmp1. Continuous comparator 22 is continuous in a sense that it observes V_ramp and V_error all the time after the first enable signal 33 has gone low until V_ramp and V_error cross. Note that the first enable signal 33 is high when the low side switching element 14 is off and it goes low with some delay after turning on the low side switching element 14 (indicated by delay_rst in FIG. 3). This delay is needed to let the current sensing on the low side switching element 14 settle and hence obtain a meaningful ramp voltage V_ramp.

Figure 4:
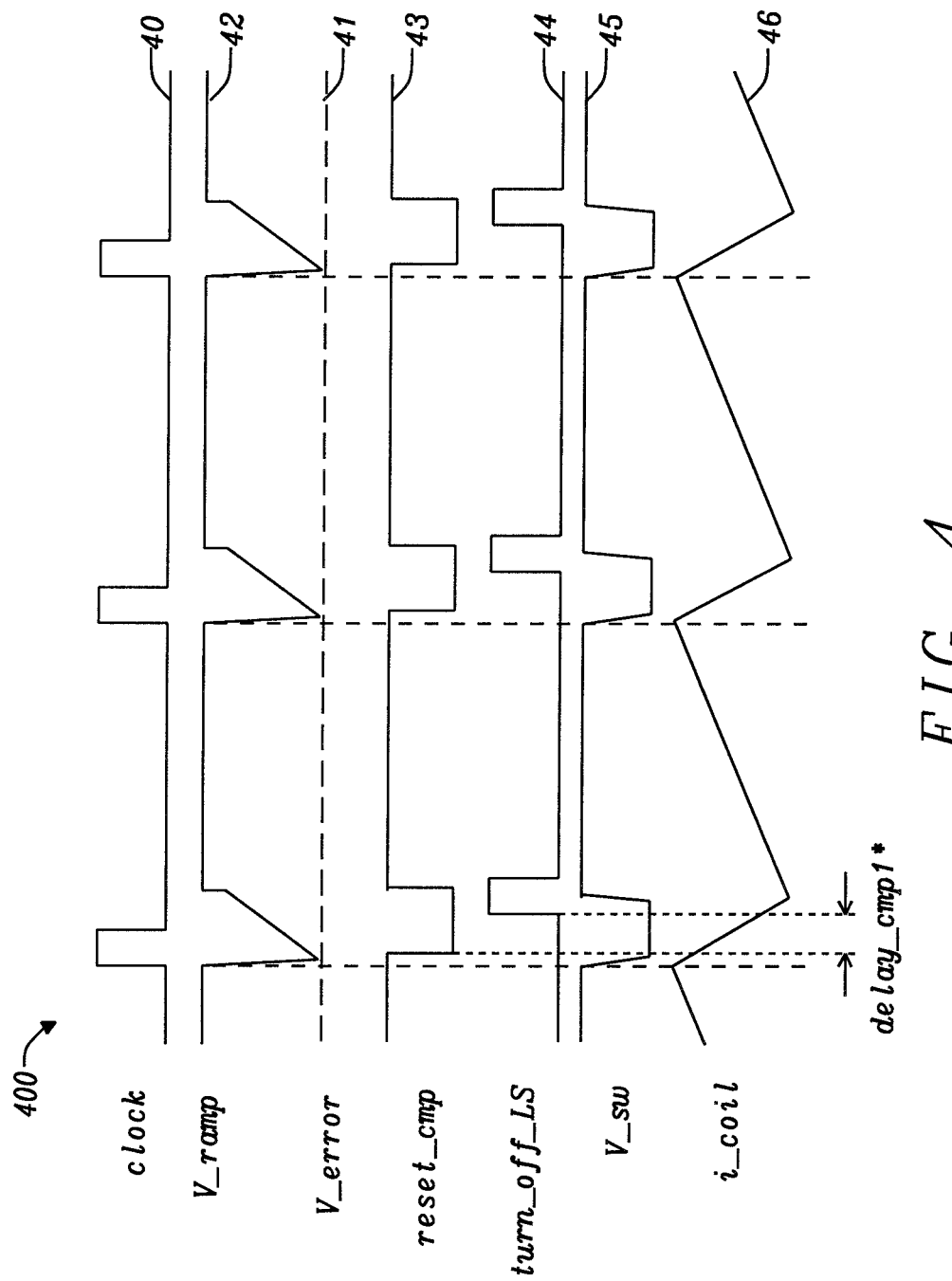
FIG. 4 shows a sequence of signals in a synchronous valley mode current control buck converter in an open loop operation, with maximum duty cycle.

FIG. 4 shows 400, a sequence of signals in the synchronous valley mode current control buck converter of FIGS. 1 and 2, in an open loop operation. Again, FIG. 4 shows the clock signal 40, the error voltage 41, the ramp voltage 42, the first enable signal 43, signal 44 for turning off the low side switching element 14, the voltage V_sw 45 at the switching terminal 15 and the inductor current i_coil 46. In case the output voltage V_out drops too much below the reference voltage V_ref, the error signal V_error will saturate to a low signal value. This may happen during a load transient or when drawing too much current from the output of the power converter.

In this condition, the maximum duty cycle of the output stage (duty cycle of the voltage V_sw at the switching terminal 15) is limited by the minimum on-time of the low side switching element 14, as shown in FIG. 4. Among other delays, the minimum on-time is limited by the delay of the continuous comparator 22, which is denoted as delay_cmp1* in FIG. 4. Note that this delay is usually almost equal to delay_cmp1 of the closed loop case although delay_cmp1* is measured from the time when the first enable signal 33, 43 reset_cmp is going low to the time when signal 44 for turning off the low side switching element 14 is going high.

From the sequence of signals illustrated in FIG. 4, the disadvantages of the prior art solution become obvious. The delay of the continuous comparator 22 limits the minimum on-time of the low side switching element 14 and ultimately limits the achievable maximum duty cycle of the power converter. Moreover, the maximum duty cycle of the output stage also sets the maximum speed at which the current in the coil may be increased from period to period. It eventually also limits the maximum current that can be drawn from the output of the buck converter if resistive losses are taken into account.

However, reducing the delay of the continuous comparator usually requires more bias current and hence affects the efficiency of the converter. Therefore, delay minimization is only possible up to a certain extent. Another solution in conventional converters is to skip clock edges and thereby reduce the frequency of the output stage. This causes a higher current ripple and also makes the frequency dependent on load conditions, which may not be desired in some applications.

A similar limitation exists for the synchronous peak current control buck converter. In this case, the minimum on-time of the high side switching element sets the minimum duty cycle of the buck converter and thereby limits the capability to decrease the coil current and eventually also to sink current at the output of the power converter.

To reduce the minimum on-time of the low side switching element 14, a latch-type comparator can be used. Latch-type comparators only make one decision once they are enabled (or clocked) and then keep the information. Due to strong positive feedback, latch-type comparators are much faster than continuous comparators.

Figure 5:
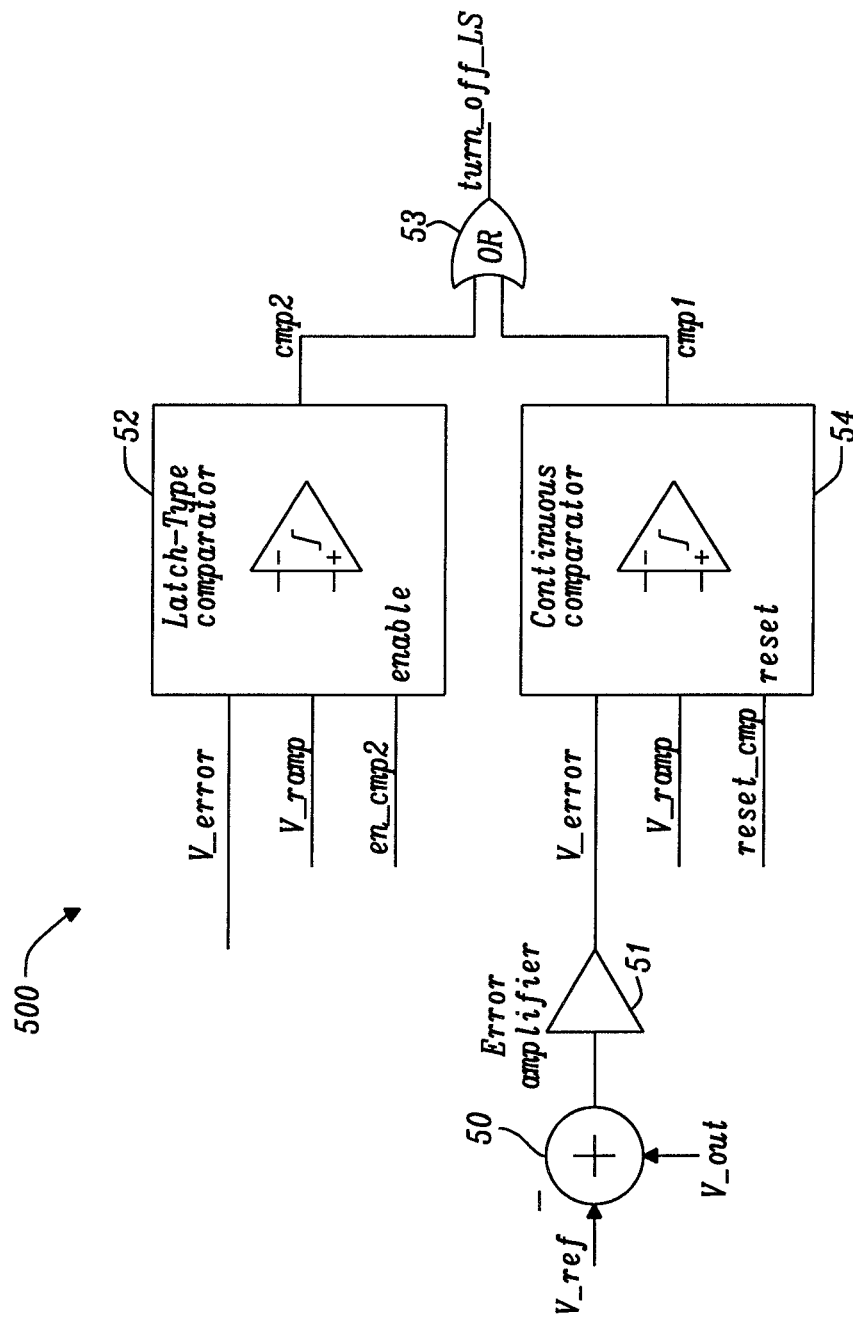
FIG. 5 shows components of a switched mode power converter with a latched comparator, embodying the principles of the disclosure.

FIG. 5 illustrates 500, components of a switched mode power converter with a latched comparator. The illustrated components and signals of FIG. 5 therein are useful for understanding the present disclosure. However, the presentation in this section is not intended to limit the scope of the invention, which is ultimately set out by the claims.

Specifically, FIG. 5 shows latched comparator 52, which can be used in the buck converter to quickly detect an open loop condition. Latched comparator 52 is arranged in parallel to a conventionally used continuous comparator 54. At the inputs of comparators 52 and 54, the ramp voltage v_ramp and the error voltage v_error are applied where the error voltage v_error is determined by the difference determination unit 50 and amplified by the error amplifier 51. In the depicted example circuit, it is assumed that the falling edge of the first enable signal reset_cmp starts the continuous comparison when the comparator inputs V_ramp and V_error are assumed to be settled and valid. At the same time, the latched comparator 52 is enabled by a second enable signal denote as en_cmp2. To simplify the design of the feedback circuit, the second feedback signal en_cmp2 is the logic inversion of first enable signal reset_cmp. Thus, the latched comparator 52 evaluates the same input signals as the continuous comparator 54 and latches the comparison of the input signals at the rising edge of the second enable signal en_cmp2. The outputs of both comparators are coupled to the inputs of an OR gate 53 which provides signal turn_off_LS for turning off the low side switching element 14 at the output of the OR gate 53.

In normal closed loop operation, the latched comparator 52 always outputs a logic zero, indicating that the inputs have not yet crossed. In this case the continuous comparator 54 turns off the low side switching element 14 and the behavior of the power converter is equivalent to the conventional case where only the continuous comparator 22 is provided in the feedback circuit (compare FIG. 2). A sequence of signals in a power converter with the power stage illustrated in FIG. 1 and the components of a feedback circuit illustrated in FIG. 5 is illustrated in FIG. 6 for the closed loop operation.

Figure 6:
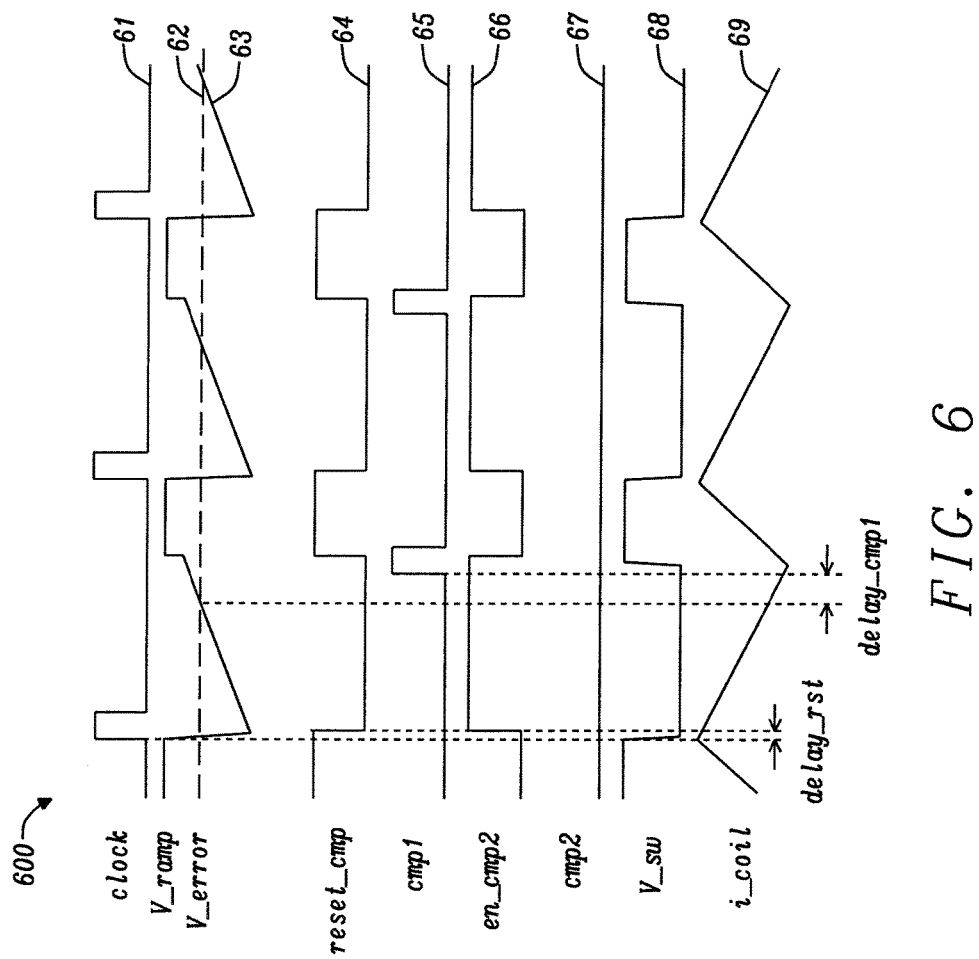
FIG. 6 shows a sequence of signals in a synchronous valley mode current control buck converter with a latched comparator in a closed loop operation.

FIG. 6 illustrates 600, a sequence of signals in a synchronous valley mode current control buck converter with a latched comparator in a closed loop operation. The signals include the clock signal 61, the error voltage 62, the ramp voltage 63, the first enable signal 64, the binary output signal 65 of the continuous comparator 54, the second enable signal 66, the binary output signal 67 of the latched comparator 52, the voltage V_sw 68 at the switching terminal 15 (which is representative of the power converter's duty cycle), and the inductor current i_coil 69.

Figure 7:
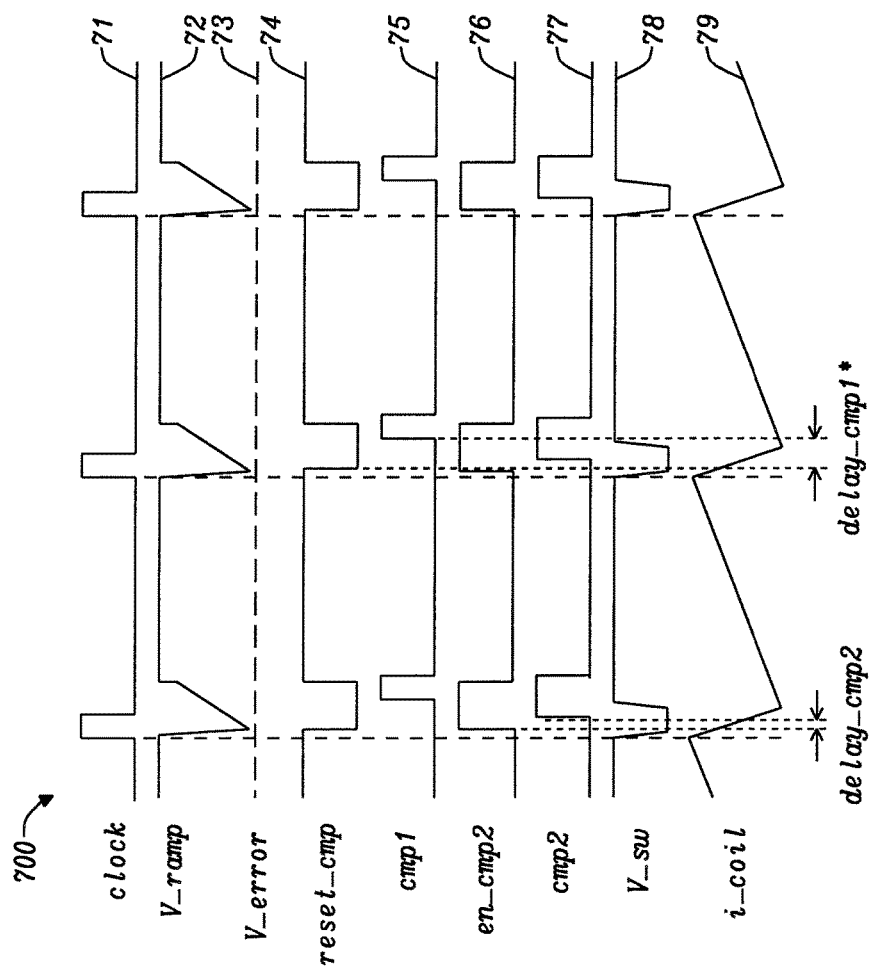
FIG. 7 shows a sequence of signals in a synchronous valley mode current control buck converter with a latched comparator in an open loop operation, with maximum duty cycle.

The open loop condition for the same circuit is depicted in FIG. 7 700. In the open loop condition, when overloading the buck converter, the inputs of the comparators have already crossed when the first enable signal reset_cmp goes low and the second enable signal en_cmp2 goes high. In other words, the error voltage is always smaller than the ramp voltage. In this case, the latched comparator 52 provides a faster detection of this condition (delay_cmp2<delay_cmp1*) and therefore the low side switching element 14 can be turned off earlier, as shown in FIG. 7.

Again, FIG. 7 illustrates the clock signal 71, the error voltage 72, the ramp voltage 73, the first enable signal 74, the binary output signal 75 of the continuous comparator 54, the second enable signal 76, the binary output signal 77 of the latched comparator 52, the voltage V_sw 78 at the switching terminal 15, and the inductor current i_coil 79.

As a result, the maximum duty cycle of the voltage V_sw in open loop conditions is higher than without the latched comparator 52 because the minimum on-time of the low side switching element 14 is reduced by the delay difference of the two comparator types.

Another advantage of latched comparator 52 is that it usually only consumes bias current while it is taking a decision, so only for a very short time. Therefore, it does not significantly increase the current consumption of the power converter.

Figure 8:
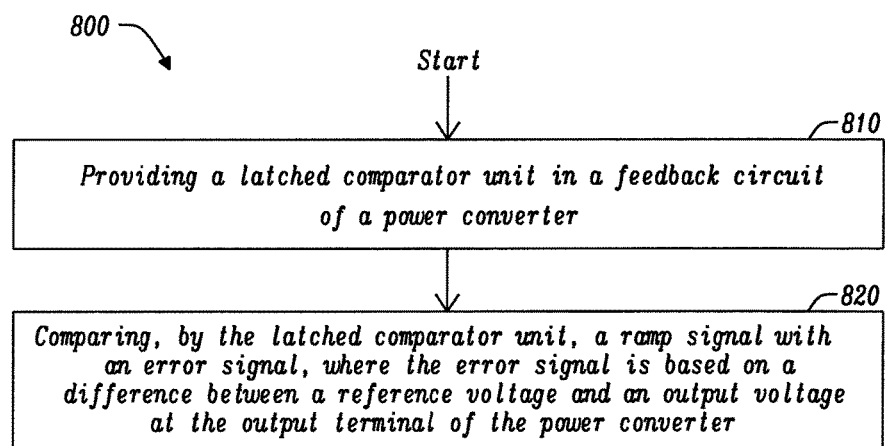
FIG. 8 shows a method for controlling the high side switching element and the low side switching element of a power converter.

FIG. 8 shows 800, a method for controlling the high side switching element and the low side switching element of a power converter. The steps include 810, providing a latched comparator unit in a feedback circuit of the power converter. The steps also include 820, comparing, by the latched comparator unit, a ramp signal with an error signal, where the error signal is based on a difference between a reference voltage and an output voltage at the output terminal of the power converter.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter comprising:
    an inductor coupled between a switching terminal and an output terminal of the power converter,
    a high side switching element coupled between an input terminal of the power converter and the switching terminal,
    a low side switching element coupled between the switching terminal and a reference terminal, and
    a feedback circuit comprising:
        a latched comparator unit configured to compare a ramp signal with an error signal, wherein the error signal is based on a difference between a reference voltage and an output voltage at the output terminal of the power converter;
        wherein the latched comparator unit is configured to generate, based on the comparison of the ramp signal and the error signal, a first binary output signal, and the power converter is configured to control the switching of the low side switching element or the high side switching element based on said first binary output signal.

2. The power converter of claim 1, wherein the latched comparator unit is configured to compare the ramp signal and the error signal at a moment in time indicated by a first enable signal.

3. The power converter of claim 1, wherein the feedback circuit further comprises a continuous comparator unit configured to continuously compare the ramp signal with the error signal during a time interval.

4. The power converter of claim 3, wherein the continuous comparator unit is configured to generate, based on the comparison of the ramp signal and the error signal, a second binary output signal, and the power converter is configured to control the switching of the low side switching element or the high side switching element based on said second binary output signal.

5. The power converter of claim 4, further comprising an OR gate configured to determine a combined binary output signal based on the second binary output signal generated by the continuous comparator unit and the first binary output signal generated by the latched comparator unit, wherein the power converter is configured to control the switching of the low side switching element or the high side switching element based on the combined binary output signal.

6. The power converter of claim 5, wherein the power converter is configured to turn off the low side switching element or the high side switching element when the combined binary output signal changes its signal value.

7. The power converter of claim 3, wherein the continuous comparator unit is configured to compare the ramp signal and the error signal at a moment in time indicated by a second enable signal, the latched comparator unit is configured to continuously compare the ramp signal and the error signal during a time interval indicated by a first enable signal, and the second enable signal is an inverted version of the first enable signal.

8. The power converter of claim 3, wherein the continuous comparator unit is configured to continuously compare the ramp signal and the error signal during the time interval, and the latched comparator unit is configured to compare the ramp signal and the error signal at an instance of time at the beginning of the time interval.

9. The power converter of claim 1, wherein the power converter is a buck converter, and the feedback circuit is configured to operate in valley mode current control or in peak mode current control.

10. The power converter of claim 1, further comprising a current measurement circuit configured to determine an inductor current through the inductor, wherein the ramp signal is based on the determined inductor current.

11. The power converter of claim 1, wherein the power converter is configured to generate the ramp signal by adding or subtracting a current sense signal of a current through the low side or high side switching element to an artificial ramp signal.

12. A method for controlling the high side switching element and the low side switching element of a power converter comprising an inductor coupled between a switching terminal and an output terminal of the power converter, wherein the high side switching element is coupled between an input terminal of the power converter and the switching terminal, and the low side switching element is coupled between the switching terminal and a reference terminal, the method comprising:
- providing a latched comparator unit in a feedback circuit of the power converter;
- comparing, by the latched comparator unit, a ramp signal with an error signal, wherein the error signal is based on a difference between a reference voltage and an output voltage at the output terminal of the power converter;
- generating, by the latched comparator unit, a binary output signal based on the comparison of the ramp signal and the error signal; and
- controlling the switching of the low side switching element or the high side switching element based on said binary output signal.

13. The method of claim 12, further comprising:
- providing a continuous comparator unit in said feedback circuit of the power converter;
- continuously comparing, by said continuous comparator unit, the ramp signal with the error signal during a time interval indicated by a second enable signal; and
- controlling the switching of the low side switching element or the high side switching element based on both a binary output signal generated by the continuous comparator unit and a binary output signal generated by the latched comparator unit.

14. The method of claim 13, further comprising:
- providing an OR gate in said feedback circuit of the power converter;
- determining, by the OR gate, a combined binary output signal based on the binary output signal generated by the continuous comparator unit and the binary output signal generated by the latched comparator unit; and
- controlling the switching of the low side switching element or the high side switching element based on the combined binary output signal.

15. The method of claim 13, wherein the power converter turns off the low side switching element or the high side switching element when the combined binary output signal changes its signal value.

16. The method of claim 13, wherein the latched comparator unit continuously compares the ramp signal and the error signal during a time interval indicated by a first enable signal, and the first enable signal is an inverted version of the second enable signal.

17. The method of claim 13, wherein the continuous comparator unit continuously compares the ramp signal and the error signal during the time interval, and the latched comparator unit compares the ramp signal and the error signal at an instance of time at the beginning of the time interval.

18. The method of claim 12, wherein a current measurement circuit determines an inductor current through the inductor, wherein the ramp signal is based on the determined inductor current.

19. The method of claim 12, wherein the power converter generates the ramp signal by adding or subtracting a current sense signal of a current through the low side or high side switching element to an artificial ramp signal.

20. The method of claim 12, wherein the step of comparing further comprises:
- comparing, by the latched comparator unit, the ramp signal with the error signal at a moment in time indicated by a first enable signal.

* * * * *